US008443839B2

(12) United States Patent
Beneker et al.

(10) Patent No.: US 8,443,839 B2
(45) Date of Patent: May 21, 2013

(54) FLUID-BIASED HYDRAULIC CONTROL VALVE WITH ARMATURE PISTON

(75) Inventors: Gerrit V. Beneker, Lake Orion, MI (US); Robert D. Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 868 days.

(21) Appl. No.: 12/582,085

(22) Filed: Oct. 20, 2009

(65) Prior Publication Data

US 2011/0089350 A1    Apr. 21, 2011

(51) Int. Cl.
*F16K 31/06* (2006.01)
(52) U.S. Cl.
USPC .................................. 137/625.65; 123/90.11
(58) Field of Classification Search
USPC ...................... 251/129.15, 129.16; 123/90.11, 123/90.12; 137/625.65–625.27
See application file for complete search history.

(56) References Cited

U.S. PATENT DOCUMENTS

| | | | | |
|---|---|---|---|---|
| 3,107,893 | A | * | 10/1963 | Bashe .............................. 251/86 |
| 3,595,265 | A | | 7/1971 | Cryder et al. |
| 4,762,000 | A | | 8/1988 | Bond, Jr. |
| 5,333,945 | A | * | 8/1994 | Volz et al. .................. 303/119.2 |
| 6,206,038 | B1 | | 3/2001 | Klein et al. |
| 6,776,131 | B2 | | 8/2004 | Dietz |
| 7,118,088 | B2 | * | 10/2006 | Hirota ...................... 251/129.19 |
| 7,137,411 | B2 | | 11/2006 | Golovatai-Schmidt et al. |
| 7,243,680 | B2 | | 7/2007 | Golovatai-Schmidt et al. |
| 7,481,242 | B2 | | 1/2009 | Golovatai-Schmidt |
| 7,971,607 | B2 | | 7/2011 | Ross et al. |
| 2005/0189510 | A1 | * | 9/2005 | Golovatai-Schmidt et al. ......................... 251/129.15 |
| 2005/0212533 | A1 | | 9/2005 | Itomi |
| 2008/0093172 | A1 | | 4/2008 | Albertson et al. |
| 2008/0196777 | A1 | * | 8/2008 | Ross et al. ............... 137/625.65 |
| 2008/0250851 | A1 | | 10/2008 | Keller et al. |
| 2009/0189104 | A1 | | 7/2009 | Bamber |

FOREIGN PATENT DOCUMENTS

| | | |
|---|---|---|
| DE | 2835749 A1 | 2/1979 |
| DE | 4125588 A1 | 2/1993 |
| DE | 19902991 C1 | 7/2000 |
| DE | 20012614 U1 | 11/2000 |
| DE | 10242959 A1 | 11/2003 |
| DE | 10223431 A1 | 12/2003 |
| DE | 102005034938 A1 | 2/2007 |
| EP | 1876380 A1 | 1/2008 |
| FR | 1188623 A | 9/1959 |
| GB | 1258416 A | 12/1971 |
| GB | 2352495 A * | 1/2001 |
| WO | 8603297 | 6/1986 |

(Continued)

*Primary Examiner* — Thomas Denion
*Assistant Examiner* — Daniel Bernstein
(74) *Attorney, Agent, or Firm* — Quinn Law Group, PLLC

(57) ABSTRACT

A hydraulic control valve has a valve body, a selectively energizable coil, and an armature positioned adjacent the coil. The coil is energizable to generate a magnetic force that moves the armature from a first position to a second position. A pole piece is positioned to establish a gap between the pole piece and the armature. The pole piece has a cavity that opens at the gap. A piston extends from the armature into the cavity and moves with the armature. The armature is biased to seat at a valve seat in the first position by pressurized fluid. Magnetic force required to move the armature away from the valve seat is a function of the difference between an area of the piston and an area defined by contact of the armature at the valve seat.

20 Claims, 3 Drawing Sheets

FOREIGN PATENT DOCUMENTS

| | | |
|---|---|---|
| WO | 9113322 | 9/1991 |
| WO | 2005102807 A1 | 11/2005 |
| WO | 2010146447 A2 | 12/2010 |

* cited by examiner

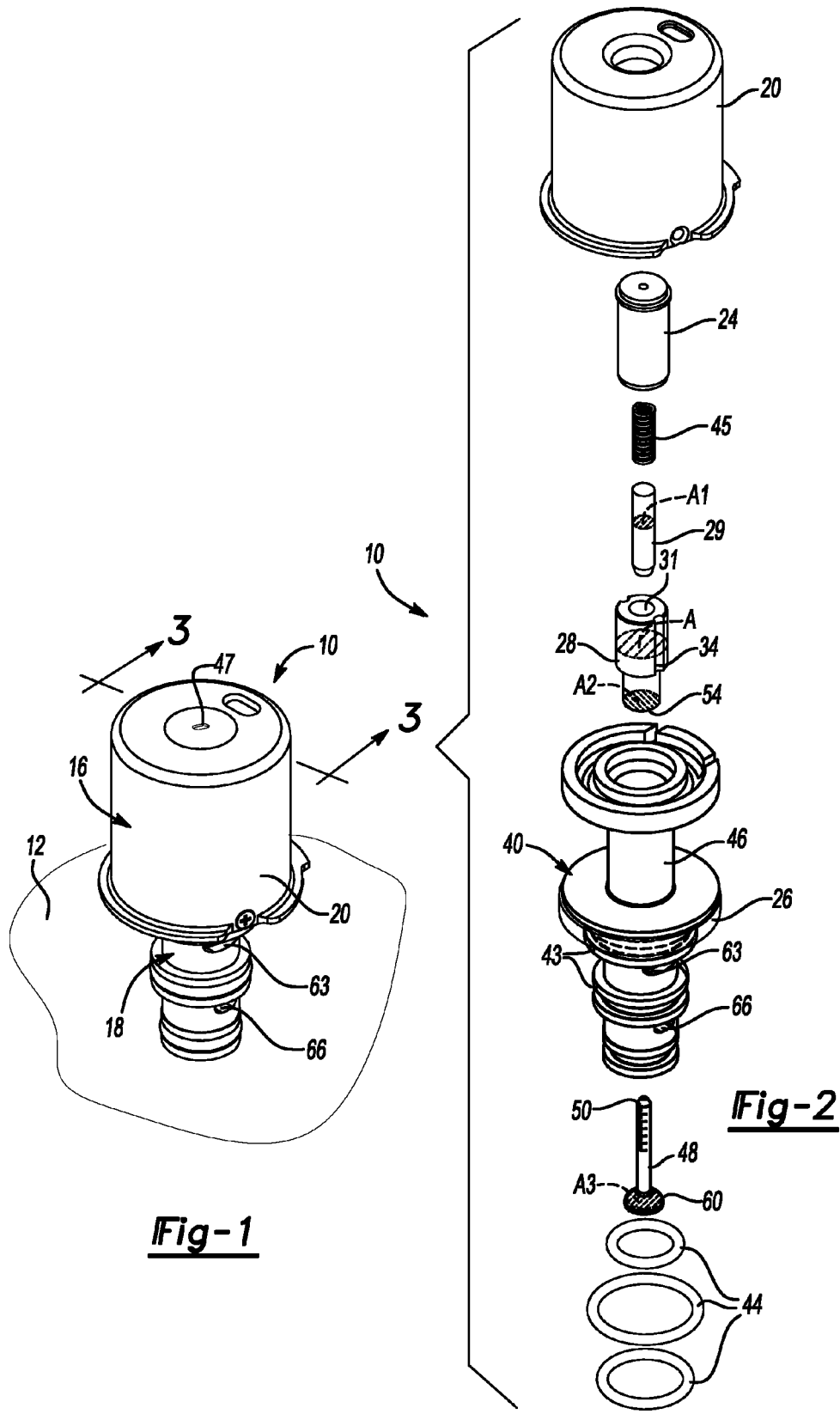

8,443,839 B2

FLUID-BIASED HYDRAULIC CONTROL VALVE WITH ARMATURE PISTON

TECHNICAL FIELD

The present invention relates to an electrically-operated hydraulic control mechanism such as a solenoid valve.

BACKGROUND OF THE INVENTION

Solenoid control valves for hydraulic control systems are used to control oil under pressure that may be used to switch latch pins in switching lifters and lash adjusters in engine valve systems. Valve lifters are engine components that control the opening and closing of exhaust and intake valves in an engine. Lash adjusters may also be used to deactivate exhaust and intake valves in an engine. Engine valves may be selectively deactivated or locked out to disable operation of some cylinders in an engine when power demands on an engine are reduced. By deactivating cylinders, fuel efficiency of an engine may be improved.

Engine deactivating solenoid control valves must operate with minimum response times to maximize engine efficiency and prevent engine damage. Valve response times include valve activation response times and deactivation response times. Solenoid control valves apply a magnetic force to an armature that moves a control valve stem by activating a coil to move the armature against a biasing force that is typically provided by a spring. Typically, a greater magnetic force applied by the solenoid will reduce response time. The magnetic force applied by the coil can be increased by increasing the size of the coil. However, cost, available space, and weight reduction considerations tend to limit the size of the coil.

SUMMARY OF THE INVENTION

A hydraulic control valve is configured to be operable with a relatively inexpensive coil by reducing the effective pressure area on which pressurized fluid acts to create a biasing force that must be overcome by magnetic force generated by the coil to move the valve to an energized position. Specifically, the valve includes a valve body, a selectively energizable coil, and an armature positioned adjacent the coil. The coil is energizable to generate a magnetic force that moves the armature from a first position to a second position. A pole piece is positioned to establish a gap between the pole piece and the armature. The pole piece has a cavity that opens at the gap. A piston extends from the armature into the cavity of the pole piece and moves with the armature. The valve body, the armature, and the piston are configured so that the armature is biased to seat at a valve seat in the first position by pressurized fluid. The magnetic force required to move the armature away from the valve seat is a function of the difference between an area of the piston and an area defined by contact of the armature at the valve seat.

In one embodiment, the armature and the valve stem include a first poppet and a second poppet, and the valve body defines a supply chamber with a first seat (i.e., the valve seat), a second seat, and a control chamber between the first and second seats. The first poppet is configured to sit at the first seat and the second poppet is configured to be spaced from the second seat in the first position to prevent pressurized fluid flow past the first seat and to exhaust fluid from the control chamber past the second seat. The first poppet is configured to be spaced from the first seat and the second poppet is configured to sit at the second seat in the second position to permit flow of pressurized fluid from the supply chamber to the control chamber and prevent flow from the control chamber to the exhaust chamber.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a perspective view of a solenoid valve;
FIG. 2 is an exploded perspective view of the solenoid valve shown in FIG. 1.

DESCRIPTION OF THE PREFERRED EMBODIMENTS

FIG. 1 illustrates a solenoid valve 10, for example, such as that used to deactivate lifters or operate a dual lift system in an internal combustion engine or diesel engine. The solenoid valve 10 may also be referred to as a hydraulic control valve or as an electromagnetic actuator. The solenoid valve 10 is installed in an engine 12. The solenoid valve 10 includes a solenoid portion 16 and a valve body 18.

Figure 3:
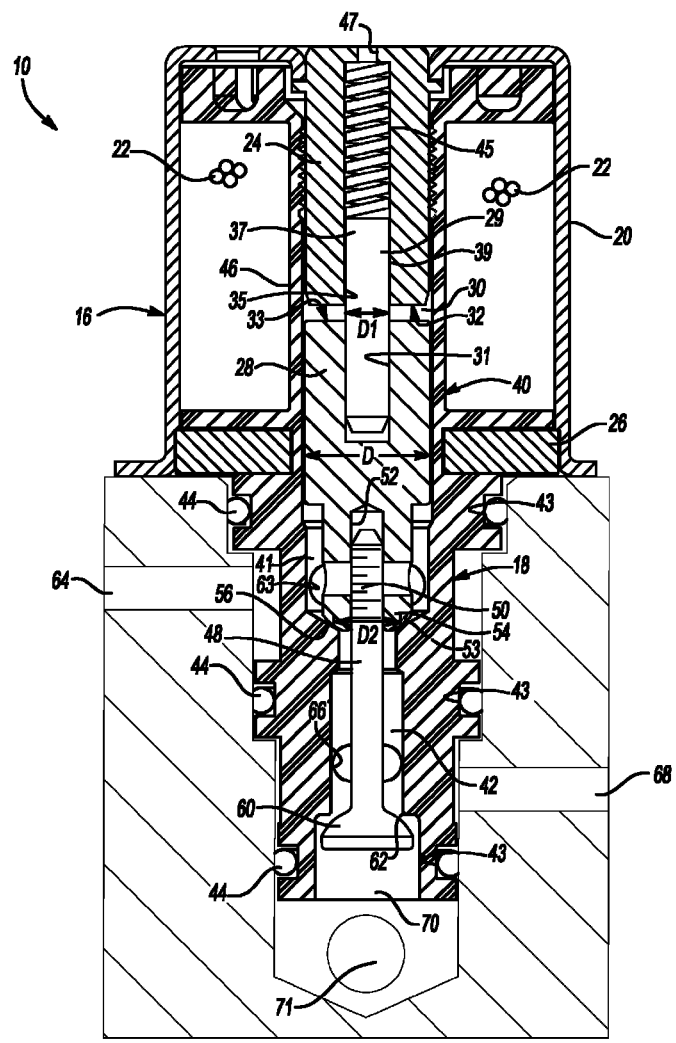
FIG. 3 is a cross-sectional view taken along the plane of section line 3-3 in FIG. 1 showing the valve in a first, closed and deenergized position.

FIGS. 2 and 3 shows the solenoid valve 10 having a solenoid can 20 that houses a coil 22 that powers the solenoid valve 10. A pole piece 24 is assembled within the solenoid can 20. The pole piece 24 defines part of the flux path for the solenoid 16. A flux collector insert 26 is disposed within the solenoid can 20 and also forms part of the flux path for the solenoid 16.

Figure 4:
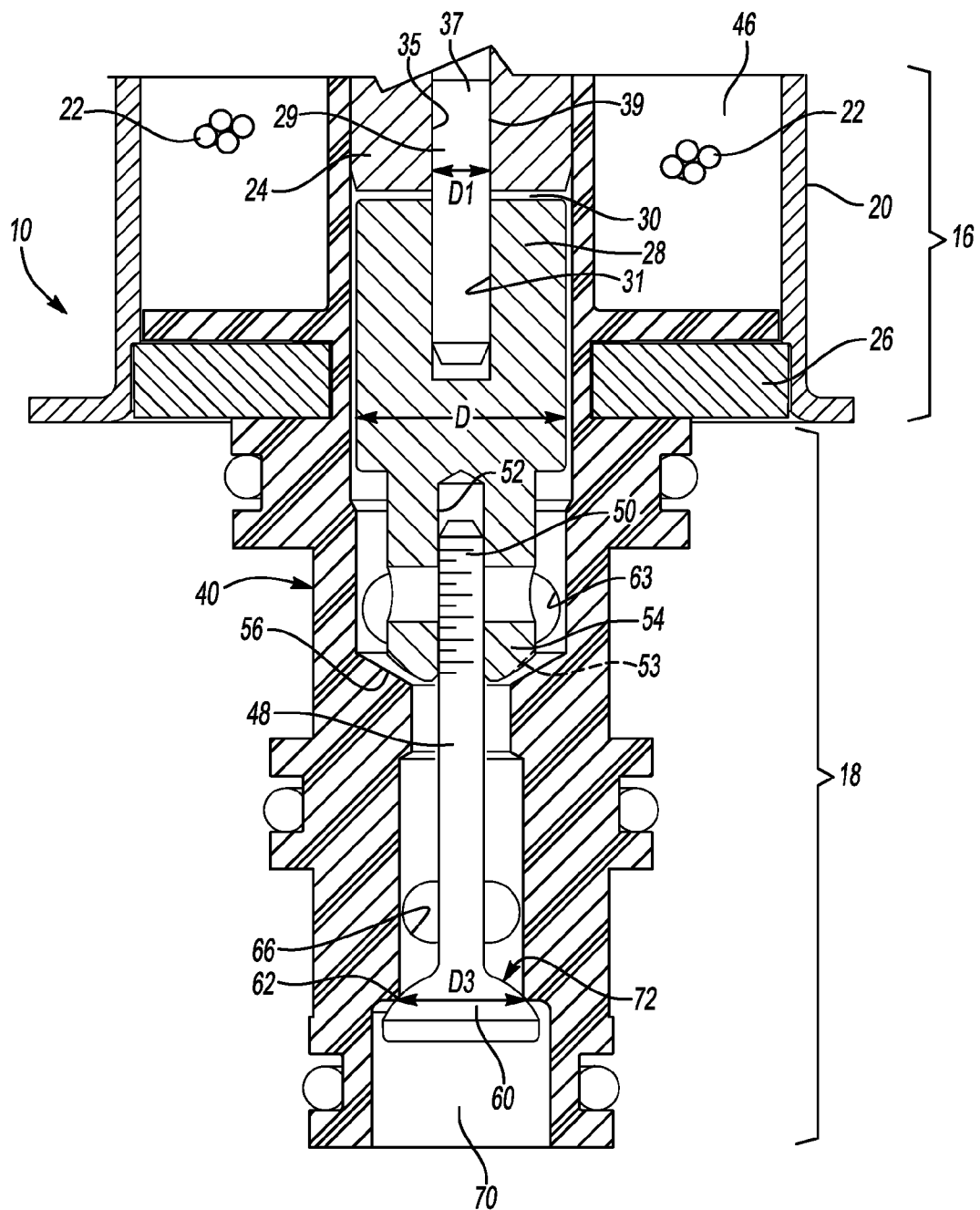
FIG. 4 is a partial cross-sectional view similar to FIG. 3 of the valve in a second, open and energized position.

An armature 28 is acted upon by the flux created by energizing the coil 22 to shift the solenoid valve 10 from a normally closed (first) position as shown in FIG. 3 to the open (second) position as shown in FIG. 4. An air gap 30 is provided between a radially-extending face 32 of the pole piece 24 and a radially-extending face 33 of the armature 28. The air gap 30 may be adjusted by adjusting the pole piece 24 relative to the armature 28. A relief groove 34, shown in FIG. 2, is provided in the armature 28 to facilitate the flow of oil under pressure axially along the armature 28. The relief groove 34 is also referred to as a conduit. Alternatively, a conduit may be formed in the valve body 18 adjacent the armature 28 to provide flow of pressurized oil across the armature 28. The flux collector insert 26 may be inserted adjacent to the coil 22 and the valve body 18 in a molded one-piece or multiple-piece body 40.

Referring to FIG. 3, a piston 29 is press-fit or otherwise secured in an opening 31 defined by the armature 28 so that the piston 29 extends from and moves with the armature 28. The piston 29 also extends into a cavity 35 formed in the pole piece 24. A head 37 of the piston 29 slides within the cavity 35 when the armature 28 moves, and is configured so that an oil seal 39 is maintained between the piston 29 and the pole piece 24. The piston 29 is a non-magnetic material so that magnetic flux is not transmitted from the armature 28 along the piston 29, thereby maintaining the effectiveness of the air gap 30.

Optionally, a spring 45 is housed in the cavity 35 between the piston 29 and the pole piece 24. The spring 45 biases the armature 28 to the first, unenergized position discussed below. Another opening 47 is provided in the pole piece 24 opposite the gap 30 and opening into the cavity 35 to minimize or relieve pressure against movement of the piston 29 toward the pole piece 24.

The valve body 18 defines an oil intake chamber 41, also referred to as a supply chamber, in which the armature 28 is disposed and that initially receives oil under pressure. The valve body 18 also defines an intermediate chamber 42, also referred to as a control chamber. A plurality of O-ring grooves 43 are provided on the exterior of the valve body 18 and each receives one of a plurality of seals 44. The seals 44 establish a seal between the valve body 18 and the engine 12. The body 40 defines an internal coil receptacle 46, or bobbin, that extends into the solenoid portion 16. The coil 22 is shown only in part, but it is understood that the coil 22 fills the coil receptacle 46. The body 40 may be formed as a one-piece integral plastic molded part, as illustrated, or could be formed in pieces and assembled together. The coil 22 is wrapped around the coil receptacle 46.

A valve stem 48 has a portion 50 that is received within an opening 52 in the armature 28. The position of the valve stem 48 may be adjusted relative to the armature 28 by a threaded connection or by a press-fit between the stem 48 and the armature 28. The armature 28 includes a poppet 54, referred to herein as a first poppet, that is moved relative to valve seat 56 in response to pressure changes, as will be more fully described below. An exhaust poppet 60, referred to herein as a second poppet, is provided on one end of the control valve stem 48 to move relative to a valve seat 62 to open and close an exhaust port 70. Valve seat 56 may be referred to herein as a first valve seat and valve seat 62 may be referred to herein as a second valve seat.

A supply gallery 64 is provided in the engine 12 to provide pressure $P_1$ to the oil intake chamber 41 that is defined in the valve body 18. A control gallery 68 is provided in the engine 12 that is normally maintained at control pressure $P_2$. An exhaust gallery 71, also provided in the engine 12, is in communication with the exhaust port 70 and is ported to ambient pressure and may be referred to as "$P_0$". The intermediate chamber 42 goes to pressure $P_0$ when the exhaust port 70 is opened. The pressure at opening 47 is also ambient pressure, $P_0$.

Referring to FIG. 4, the solenoid valve 10 is shown in the open position. The coil 22 is energized to retract the armature 28 toward the coil 22. The first poppet 54 opens the first valve seat 56 to provide pressure $P_1$ from the oil intake chamber 41 to the intermediate chamber 42, and the exhaust poppet 60 sits at seat 62 to close the exhaust port 70.

Referring to FIGS. 2-4, the valve body 18 includes a supply port or opening 63 that receives oil under pressure from the supply gallery 64 that is in communication with the oil intake chamber 41 and the valve seat 56. When the valve seat 56 is open, the intake chamber 41 is in communication with the intermediate chamber 42. Oil under pressure is provided through an outlet opening 66, also referred to as a control port, and to the control gallery 68.

In operation, the valve 10 is normally closed as shown in FIG. 3 and is shifted to its open position as shown in FIG. 4 by energizing the coil 22. The coil 22, when energized, reduces the air gap 30 formed between the pole piece 24 and the armature 28. The armature 28 is shifted toward the pole piece 24 by electromagnetic flux created by the coil 22. Oil in chamber 41 is in communication with the gap 30 through the relief groove 34.

When in the normally closed position shown in FIG. 3, the poppet 54 closes the valve seat 56, isolating the oil intake chamber 41, which is at $P_1$, from the intermediate chamber 42, which is at $P_0$. The oil under pressure in the oil intake chamber 41 biases the poppet 54 against the valve seat 56. Assuming the armature 28 and the piston 29 are generally circular in cross-section, or have a cross-sectional area equivalent to a circle, the area of face 33 has an annular shape and is the difference between the cross-sectional area of the armature 28, represented as area A in FIG. 2, and the cross-sectional area A1 of the piston 29. An area A2 (see FIG. 2) is defined by a contact diameter D2 at which the poppet 54 of the armature 28 contacts the valve seat 56. Surface area 72 is referred to as cross-sectional area A3 in FIG. 2 and is defined by a contact diameter D3 at which the poppet 60 contacts the valve seat 62. Although cross-sectional areas described herein are assumed to be circular, the components establishing the areas may have any shape with an effective area equal to that of a circle.

Force vectors acting on the valve 10 may be defined as follows:

Fm=magnetic force of the solenoid 16;
Fca=force on armature 28 to close after deenergizing the solenoid 16;
F1=A1*P1=force of fluid at supply pressure on piston 29;
F2=A2*P1=force of fluid at supply pressure on armature 28;
F03=A2*P0=force in control chamber 42 before energizing the solenoid 16;
Fc3=A2*P1=force in control chamber 42 during energizing of the solenoid 16;
Fs=force of spring 45;
F4=A1*P0=atmospheric force on the piston 29;
F5=control/supply force on the seat 62; and
F6=atmospheric force on seat 62.

Accordingly, a force balance equation to move the valve 10 to open valve seat 56 and close valve seat 62 is as follows:

$$Fm+F1-F2+F03-F4-Fs<0,$$

assuming the valve 10 includes optional spring 45, and with forces acting in the same direction as the magnetic force of the solenoid 10 being considered positive.

This is rewritten as:

$$Fm>-F1+F2-F03+F4+Fs,$$

and as $$Fm>-(A1*P1)+(A2*P1)-(A2*P0)+(A1*P0)+Fs.$$

Assuming that P0, atmospheric pressure, is zero, then:

$$Fm>-(A1*P1)+(A2*P1)+Fs.$$

Compare this to the magnetic force required when there is no piston 29:

$$Fm>(A2*P1)+Fs.$$

In both cases, Fs may be zero if no optional spring is used.

Thus by keeping the two diameters D1 and D2 relatively close in size, A1 and A2 are nearly equal, and the required magnetic force of the solenoid 10 necessary to open the seat 54 reduces drastically. This allows a smaller, and therefore less expensive, coil 22 to be used.

Similarly, a force balance equation to move the valve 10 to close valve seat 56 and open valve seat 62 is:

$$Fca+F1-F2+Fc3-F4-F5+F6-Fs<0,$$

assuming the valve 10 includes optional spring 45, and with forces acting in the same direction as the closing force to close armature 28 being considered positive.

This is rewritten as:

$$Fca > -F1 + F2 - Fc3 + F4 + +F5 - F6 + Fs,$$

and as $$Fca > -(A1*P1) + (A2*P1) - (A2*P1) + (A1*P0) + (A3*P1) - (A3*P0) + Fs.$$

Assuming that P0, atmospheric pressure, is zero, then $$Fca > -(A1*P1) + (A3*P1) + Fs.$$

Compare this to the closing force required when there is no piston 29:

$$Fca > F5 + Fs;$$

$$Fca > (A3*P1) + Fs.$$

In both cases, Fs may be zero if no optional spring is used.

Thus by keeping diameter D3 larger than diameter D1, the closing force Fca is large enough to close the seat 56. As the difference between the diameters D1 and D3 increases, the closing speed of the valve 10 upon deenergization of the coil 22 also increases. The optional spring 45 also assists in increasing the closing speed.

Thus, the effective pressure area on which P1 is acting to bias the armature 28 to the first (unenergized) position of FIG. 3 is only the difference between the area A2 at the contact diameter D2 and the cross-sectional area of the piston A1. The diameter D1 of the piston 29 is less than the contact diameter D2 so that this effective area on which P1 acts is downward in FIG. 3, in effect applied to a portion of surface 33. The addition of the piston 29 thus lessens the effective area on which pressurized fluid must be applied to maintain the valve 10 in the closed, unenergized position, and thereby lessens the pressure differential that must be overcome in order begin opening of the valve 10. The force of the optional spring 45 must also be overcome in order to fully move the valve 10 to the energized position. However, the force of the spring 45 helps to maintain the valve in the closed position of FIG. 3, especially if the valve 10 is subjected to high G-forces. In an alternative embodiment, instead of a spring 45, a biasing force to help maintain the closed position may be established by providing a passage from the intermediate chamber 42 or control gallery 68 to the opening 47 so that control pressure P2 is maintained at the surface of the piston 29 exposed to the opening 47.

When the coil 22 is energized, flux between the pole piece 24 and armature 28 pulls the armature 28 toward the pole piece 24, as shown in FIG. 4. The face-to-face orientation of the armature 28 relative to the pole piece 24 subjects the armature 28 to exponentially greater magnetic force as the air gap 30 decreases. In order to move the armature 28 to the energized (second) position of FIG. 4, the magnetic force of the coil 22 must overcome the pressure differential discussed above that biases the armature 28 to the first position of FIG. 3 as well as the force of spring 45.

Shifting the armature 28 causes the poppet 54 to open relative to the valve seat 56, thereby providing pressure $P_1$ from the oil intake chamber 41 to the intermediate chamber 42. The intermediate chamber 42 is normally maintained at pressure $P_0$ but is increased to $P_1$ when the poppet 54 opens the valve seat 56 and the poppet 60 closes valve seat 62 to close off the exhaust port 70. In this embodiment, the contact diameter D3 is greater than contact diameter D2 and greater than diameter D1. In other embodiments, the relative sizes of diameters D2 and D3 may be different, depending on the desired functions of the valve 10. This change in pressure from $P_2$ to $P_1$ increases the hydraulic pressure supplied to the engine valve system to $P_1$. When the pressure provided to the engine valve system changes to $P_1$, selected engine valves may be deactivated by latch pins, lash adjusters or another controlled device (not shown) to thereby deactivate selected cylinders of the engine 12.

When the coil 22 is subsequently de-energized, the forces due to the flux are removed (i.e., the net force pulling the armature 28 toward the pole piece 24), causing the net force Fca to drive the armature 28 to the normally closed, deenergized position of FIG. 3. Thus, the armature 28 is configured so that the net fluid force (i.e., net downward force acting on A3 less A1) as well as optional spring force Fs contributes to closing the valve 10, with the chamber 42 exhausting to exhaust port 70, thereby providing relatively quick valve actuation response time from the energized to the deenergized position.

The valve 10 is provided with an air purging and self-cleaning feature. Specifically, the armature 28 is formed with a bypass slot 53, also referred to as a bypass channel, to permit a limited amount of oil to move from chamber 41 to chamber 42 when the valve 10 is closed, bypassing the seat 56. Alternatively, the bypass slot may be provided in the body 18 adjacent the seat 56. The slot 53 also allows particles of dirt to be expelled from chamber 41 with the oil, and thus functions as a "self-cleaning" feature of the valve 10. Additionally, air is purged from the chamber 41 through slot 53, thus preventing an air cushion from acting against movement of the valve 10 to the energized position of FIG. 4 when the coil 22 is subsequently energized. This allows consistent transitioning from the deenergized to the energized position.

When the engine 12 is off so that no fluid pressure is provided in the valve 10 and the coil 22 is deenergized, assuming that the valve 10 is installed in the engine 12 with the armature 28 above the pole piece 24 (i.e., upside down with respect to the view shown in FIGS. 3 and 4), gravity will cause the armature 28 to fall to the energized position of FIG. 4 (although the coil is not energized). Thus, when the engine 12 is started, pressurized oil will come up the supply gallery 64 and force any air ahead of it out of the supply chamber 41 to the control chamber 42, past the open seat 56 as the oil proceeds into chamber 41 and gap 30, biasing the armature 28 to the closed, deenergized position of FIG. 3. The air is expelled from chamber 42 to exhaust port 70 as the poppet 60 unseats.

While the best modes for carrying out the invention have been described in detail, those familiar with the art to which this invention relates will recognize various alternative designs and embodiments for practicing the invention within the scope of the appended claims.

The invention claimed is:

1. A hydraulic control valve comprising:
   a valve body;
   a selectively energizable coil;
   an armature positioned adjacent the coil; the coil being energizable to generate a magnetic force that moves the armature from a first position to a second position;
   a pole piece positioned to establish a gap between the pole piece and the armature and having a cavity that forms an opening at the gap;
   a piston extending from the armature into the cavity of the pole piece and movable with the armature;
   wherein the valve body, the armature, and the piston are configured so that the armature is biased to seat at a first valve seat in the first position by pressurized fluid;
   wherein the magnetic force required to move the armature away from the first valve seat is a function of the difference between an area of the piston and an area defined by contact of the armature at the first valve seat;

a valve stem extending from the armature opposite the piston and movable with the armature;

wherein the armature and the valve stem include a first poppet and a second poppet; wherein the valve body defines a supply chamber with the first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; and wherein the first poppet is configured to be spaced from the first seat and the second poppet is configured to sit at the second seat in the second position to permit flow of pressurized fluid from the supply chamber to the control chamber and prevent flow from the control chamber to an exhaust port.

2. The hydraulic control valve of claim 1, wherein the piston and pole piece are configured so that an oil seal is formed between the piston and pole piece.

3. The hydraulic control valve of claim 1, further comprising:

a spring positioned in the cavity between the pole piece and the piston to bias the armature to the first position.

4. A hydraulic control valve comprising:

an energizable coil; an armature; a pole piece; a piston extending from the armature;

a valve body defining a valve seat, an exhaust seat, a supply port, a control port, and an exhaust port;

wherein the armature includes a first poppet seated at the valve seat when the coil is not energized and substantially preventing pressurized fluid flow from the supply port past the valve seat to the control port; wherein the armature is shifted within the valve body toward the pole piece by a magnetic force generated by the energized coil to move the first poppet away from the valve seat to allow fluid flow from the supply port to the control port; wherein the piston is configured to slide in the pole piece when the armature moves; and wherein the valve is configured such that the magnetic force required to move the first poppet away from the valve seat is a function of a difference between a diameter of the piston and a first contact diameter at which the first poppet contacts the valve seat.

5. The hydraulic control valve of claim 4, further comprising:

a valve stem assembled to the armature opposite the piston and having an exhaust poppet that is spaced from the exhaust seat when the coil is not energized to allow fluid flow from the control port to the exhaust port, and that is seated at the exhaust seat to prevent fluid flow from the control port to the exhaust port when the coil is energized.

6. The hydraulic control valve of claim 5, wherein the valve is configured such that solenoid force required to maintain the energized position is a function of the difference between a contact diameter of the exhaust poppet at the exhaust seat and the piston diameter.

7. The hydraulic control valve of claim 4, further comprising:

a spring positioned between the pole piece and the piston to bias the first poppet to seat at the valve seat when the coil is not energized.

8. The hydraulic control valve of claim 4, wherein one of the valve body and the first poppet form a bypass channel at the first seat, allowing air to bleed from the supply port to the control port through the bypass channel when the valve is in a first position in which the coil is not energized.

9. A hydraulic control valve comprising:

an energizable coil, an armature, a pole piece, a piston extending from the armature;

a valve body defining a valve seat, an exhaust valve seat, a supply port, a control port, and an exhaust port;

wherein the armature includes a first poppet seated at the valve seat when the coil is not energized and substantially preventing pressurized fluid flow from the supply port past the valve seat to the control port; wherein the armature is shifted within the valve body toward the pole piece by a magnetic force generated by the energized coil to move the first poppet away from the valve seat to allow fluid flow from the supply port to the control port; wherein the piston is configured to slide in the pole piece when the armature moves; wherein the valve is configured such that a force required to move the first poppet away from the valve seat is a function of a difference between a diameter of the piston and a diameter at which the first poppet contacts the valve seat;

a spring positioned in the cavity between the pole piece and the piston to bias the first poppet to seat at the valve seat when the coil is not energized;

a valve stem assembled to the armature opposite the piston and having an exhaust poppet that is spaced from the exhaust seat when the coil is not energized to allow fluid flow from the control port to the exhaust port, and that is seated at the exhaust seat to prevent fluid flow from the control port to the exhaust port when the coil is energized; and wherein the valve is configured such that a force required to maintain the energized position is a function of a difference between a contact diameter of the exhaust poppet at the exhaust seat and the piston diameter.

10. A hydraulic control valve comprising:

a valve body;

a selectively energizable coil;

an armature positioned adjacent the coil; the coil being energizable to generate a magnetic force that moves the armature from a first position to a second position;

a pole piece positioned to establish a gap between the pole piece and the armature and having a cavity that forms an opening at the gap;

a piston extending from the armature into the cavity of the pole piece and movable with the armature;

wherein the valve body, the armature, and the piston are configured so that the armature is biased to seat at a valve seat in the first position by pressurized fluid;

wherein the magnetic force required to move the armature away from the valve seat is a function of the difference between an area of the piston and an area defined by contact of the armature at the valve seat; and wherein the pole piece defines another opening opposite the opening at the gap to relieve pressure against movement of the piston toward the pole piece.

11. The hydraulic control valve of claim 10, wherein the piston and pole piece are configured so that an oil seal is formed between the piston and pole piece.

12. The hydraulic control valve of claim 10, further comprising:

a spring positioned in the cavity between the pole piece and the piston to bias the armature to the first position.

13. The hydraulic control valve of claim 10, wherein the valve seat is a first seat, and further comprising:

a valve stem extending from the armature opposite the piston and movable with the armature;

wherein the armature and the valve stem include a first poppet and a second poppet; wherein the valve body defines a supply chamber with the first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; wherein the first poppet is configured to be spaced from the first seat and the second poppet is configured to sit at the second seat in the second position to permit flow of pressurized fluid from the supply chamber to the control chamber and prevent flow from the control chamber to an exhaust port.

14. The hydraulic control valve of claim 13, wherein the piston has a first diameter; wherein the first poppet contacts the first seat to establish the first contact diameter when in the first position; wherein the second poppet contacts the second seat to establish a second contact diameter when in the second position; wherein the first diameter is less than the first contact diameter and the first contact diameter is less than the second contact diameter.

15. The hydraulic control valve of claim 13, in combination with an engine; wherein the hydraulic control valve is mounted to the engine such that the armature falls to the second position when the engine is off and the coil is not energized, thereby moving the first poppet off of the first seat to open the supply chamber to the control chamber, air thereby expelling from the supply chamber to the control chamber and further expelling to the exhaust port when the armature and valve stem move to the first position when the engine is restarted.

16. The hydraulic control valve of claim 13, wherein one of the valve body and the first poppet form a bypass channel at the first seat, allowing air to bleed from the supply chamber to the control chamber through the bypass channel when the valve is in the first position.

17. A hydraulic control valve comprising:
a valve body;
a selectively energizable coil;
an armature positioned adjacent the coil; the coil being energizable to generate a magnetic force that moves the armature from a first position to a second position;
a pole piece positioned to establish a gap between the pole piece and the armature and having a cavity that forms an opening at the gap;
a piston extending from the armature into the cavity of the pole piece and movable with the armature;
wherein the valve body, the armature, and the piston are configured so that the armature is biased to seat at a first valve seat in the first position by pressurized fluid;
wherein the magnetic force required to move the armature away from the valve seat is a function of the difference between an area of the piston and an area defined by contact of the armature at the first valve seat;
a valve stem extending from the armature opposite the piston and movable with the armature;
wherein the armature and the valve stem include a first poppet and a second poppet; wherein the valve body defines a supply chamber with the first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; wherein the first poppet is configured to be spaced from the first seat and the second poppet is configured to sit at the second seat in the second position to permit flow of pressurized fluid from the supply chamber to the control chamber and prevent flow from the control chamber to an exhaust port;

wherein the piston has a first diameter; wherein the first poppet contacts the first seat to establish the first contact diameter when in the first position; and wherein the second poppet contacts the second seat to establish a second contact diameter when in the second position; wherein the first diameter is less than the first contact diameter and the first contact diameter is less than the second contact diameter.

18. A hydraulic control valve in combination with an engine, the hydraulic control valve comprising:
a valve body;
a selectively energizable coil;
an armature positioned adjacent the coil; the coil being energizable to generate a magnetic force that moves the armature from a first position to a second position;
a pole piece positioned to establish a gap between the pole piece and the armature and having a cavity that forms an opening at the gap;
a piston extending from the armature into the cavity of the pole piece and movable with the armature;
wherein the valve body, the armature, and the piston are configured so that the armature is biased to seat at a first valve seat in the first position by pressurized fluid;
wherein the magnetic force required to move the armature away from the valve seat is a function of the difference between an area of the piston and an area defined by contact of the armature at the first valve seat;
a valve stem extending from the armature opposite the piston and movable with the armature;
wherein the armature and the valve stem include a first poppet and a second poppet; wherein the valve body defines a supply chamber with the first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; wherein the first poppet is configured to be spaced from the first seat and the second poppet is configured to sit at the second seat in the second position to permit flow of pressurized fluid from the supply chamber to the control chamber and prevent flow from the control chamber to an exhaust port; and
wherein the hydraulic control valve is mounted to the engine such that the armature falls to the second position when the engine is off and the coil is not energized, thereby moving the first poppet off of the first seat to open the supply chamber to the control chamber, air thereby expelling from the supply chamber to the control chamber and further expelling to the exhaust port when the armature and valve stem move to the first position when the engine is restarted.

19. A hydraulic control valve comprising:
a valve body;
a selectively energizable coil;
an armature positioned adjacent the coil; the coil being energizable to generate a magnetic force that moves the armature from a first position to a second position;

a pole piece positioned to establish a gap between the pole piece and the armature and having a cavity that forms an opening at the gap;

a piston extending from the armature into the cavity of the pole piece and movable with the armature;

wherein the valve body, the armature, and the piston are configured so that the armature is biased to seat at a first valve seat in the first position by pressurized fluid;

wherein the magnetic force required to move the armature away from the valve seat is a function of the difference between an area of the piston and an area defined by contact of the armature at the first valve seat;

a valve stem extending from the armature opposite the piston and movable with the armature;

wherein the armature and the valve stem include a first poppet and a second poppet; wherein the valve body defines a supply chamber with the first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; wherein the first poppet is configured to be spaced from the first seat and the second poppet is configured to sit at the second seat in the second position to permit flow of pressurized fluid from the supply chamber to the control chamber and prevent flow from the control chamber to an exhaust port; and wherein one of the valve body and the first poppet form a bypass channel at the first seat, allowing air to bleed from the supply chamber to the control chamber through the bypass channel when the valve is in the first position.

20. The hydraulic control valve of claim 19, further comprising:

a spring positioned in the cavity between the pole piece and the piston to bias the armature to the first position.

* * * * *